G. ALFANO.
ANIMAL FEED BOX OR TROUGH.
APPLICATION FILED MAR. 6, 1914.
1,112,048.
Patented Sept. 29, 1914.
2 SHEETS—SHEET 2.
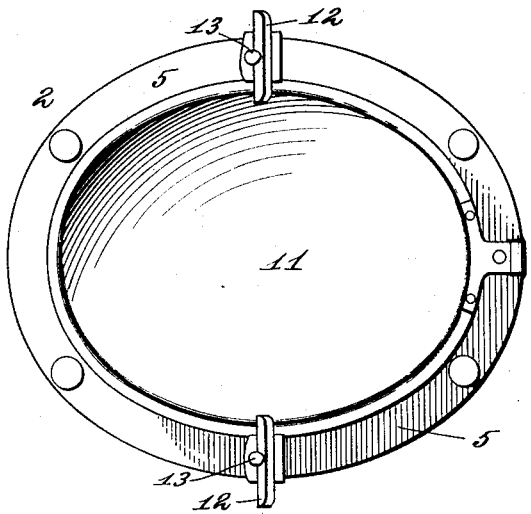
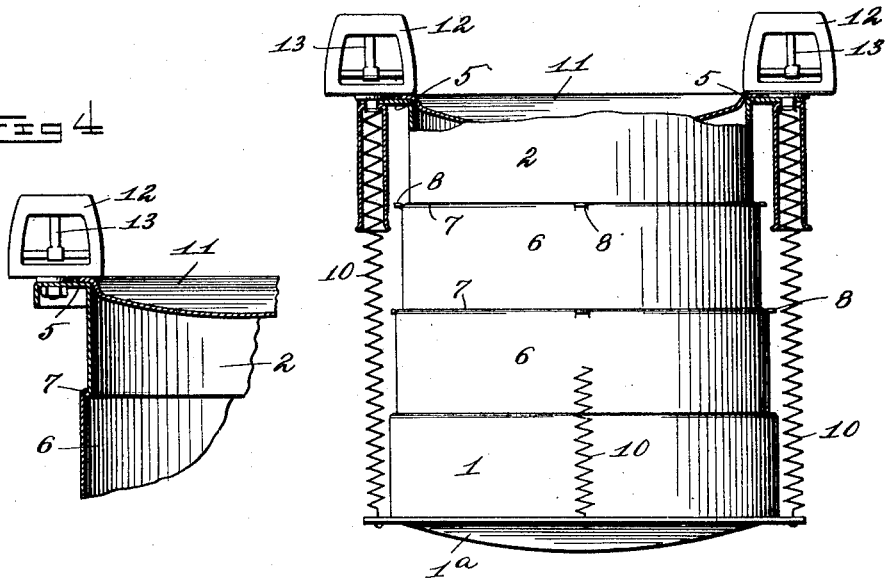
Witnesses
C. H. Fesler
F. M. Getz
Inventor
Giuseppe Alfano
By Meyers Cushman Rea
Attorney

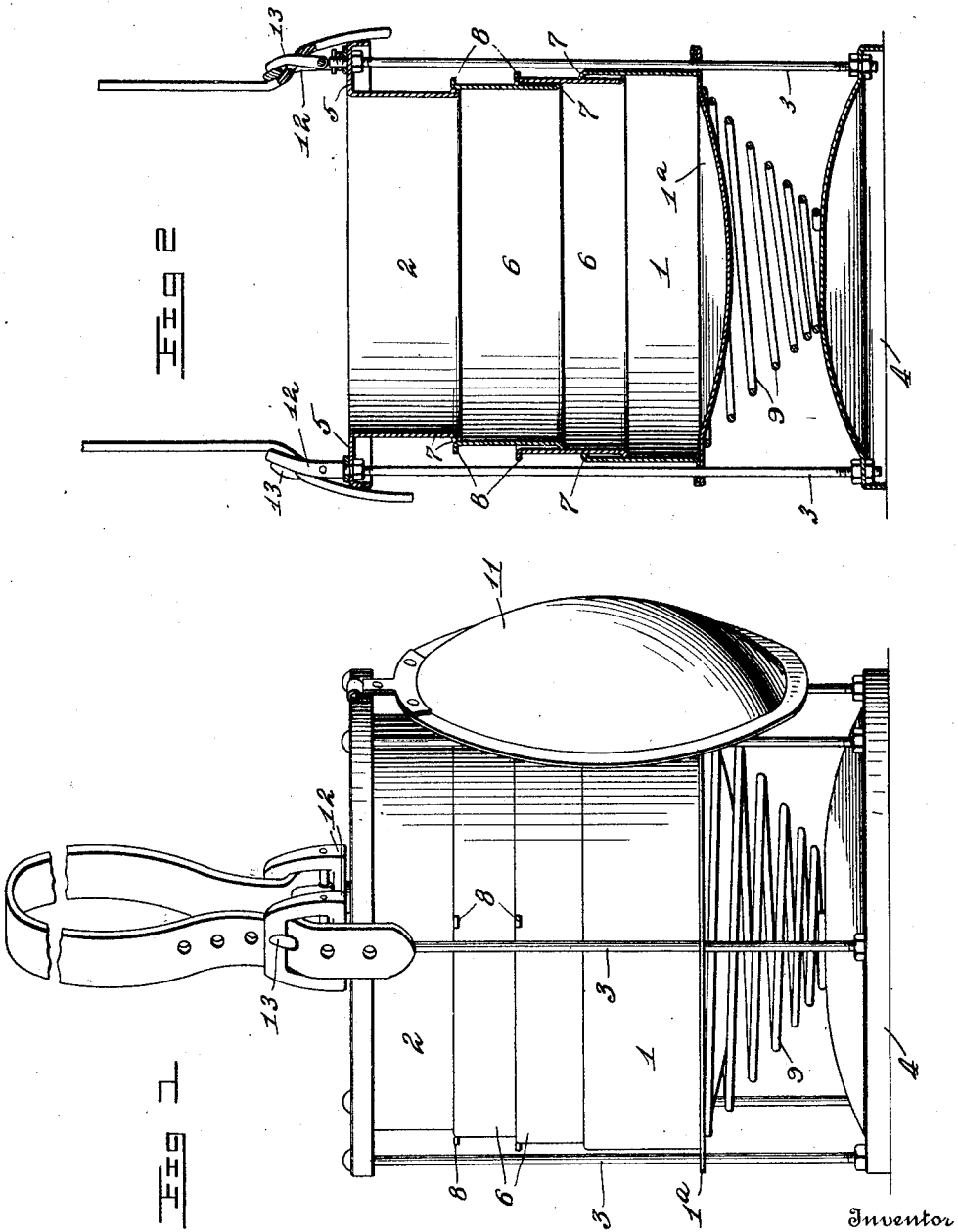

UNITED STATES PATENT OFFICE.

GIUSEPPE ALFANO, OF PITTSTON, PENNSYLVANIA, ASSIGNOR OF ONE-HALF TO SAMUEL LUCCHINO, TRUSTEE, OF PITTSTON, PENNSYLVANIA.

ANIMAL FEED BOX OR TROUGH.

1,112,048.   Specification of Letters Patent.   Patented Sept. 29, 1914.

Application filed March 6, 1914. Serial No. 822,874.

*To all whom it may concern:*

Be it known that I, GIUSEPPE ALFANO, a subject of the King of Italy, who intends to become a citizen of the United States, residing at Pittston, in the county of Luzerne and State of Pennsylvania, have invented new and useful Improvements in Animal Feed Boxes or Troughs, of which the following is a specification.

My invention relates to improvements in feed bags or troughs for horses or other animals, and has for its object to provide a feeder the depth of which is variable, dependent upon the amount of feed deposited therein, upon the principle of the weight of the feed, and which is automatically collapsible, dependent upon the removal of the feed therefrom by the animal; which is certain in action and cleanly.

Heretofore it has been proposed to provide a feed bag or the like of accordion construction with springs to collapse the accordion structure during the feeding of the animal. In such contrivance however the feed necessarily collects between the accordion plaits of the device and prevents proper collapsing, with the liability of accumulations which would be uncleanly and otherwise undesirable. It has been proposed also to have such a device composed in part of rigid and flexible members, which proposal is open to substantially the same objection existing with respect to the accordion type of device.

My invention presents a feed bag or the like patterned upon the plan of a series of substantially rigid telescoping sections which may be constructed, for lightness, conveniently of aluminum, although the same may be constructed of any other sufficiently light and rigid material. With this construction there is no room for accumulation of food to detract from the intended automatic operation of the device, or for unsanitary accumulation of feed.

The invention consists of the features hereinafter described, illustrated in the drawing, and set forth in the claims appended to the description.

In the accompanying drawings—Figure 1 is a side elevation of the improved feed trough. Fig. 2 is a central section taken through the same. Fig. 3 is a top plan view with the lid closed. Fig. 4 is a detail enlarged section of the upper end of the trough. Fig. 5 is a side elevation of a modified form of the feed trough.

In the said drawing the reference numeral 1 designates the outer or lower annular rigid member of the feed bag or trough having a bottom $1^a$, and 2 the inner or upper annular member thereof.

3 designate guide rods rigidly connected to a base 4 and the upper member 2, which pass through perforations in a flange 5 of the lower member, and serve to guide the movement of the lower member in the extension or contraction of the feed bag or trough. Interposed between the upper and lower members are a series of as many as may be desired similar annular rigid sections 6. The lower rim of one section, and the contiguous upper rim of the adjacent section form interengaging parts or flanges 7, so that when feed is deposited into the bag or trough the weight thereof will consecutively, through interaction between the several rigid sections, extend the feed bag to its capacity of extension. The several sections interposed between the bottom and top sections are also provided with fingers 8 overhanging the several adjacent sections, so that upon food being removed from the bag or trough the several sections will be interengaged and collapsed, moving smoothly and evenly under the influence of the spring element or elements combined therewith as herein described.

Combined with the lower section of the feed bag or trough, and the base 4, is a spring constituent 9 which in Fig. 1 is shown as centrally arranged beneath the lower or bottom section of the feed trough section, and in Fig. 5 as consisting of several spring elements 10 radially arranged. In both forms of the invention when feed to the maximum is introduced into the feed bag or trough the several sections thereof are extended to the maximum thereof against spring tension. As the animal gradually removes the food from the trough the structure is gradually collapsed, so that the animal feeds from the same level of trough until the food content is exhausted.

The several annular sections of the feed bag or trough constitute the entire vertical wall of the trough or bag either in collapsed or extended position, and move interrelatively in a rectilinear line without presenting pockets or cavities for the gathering or accretion of food material to detract from the intended normal operation of the parts, or to present unsanitary accumulation of food. When the feed is introduced into the bag or trough the latter is extended against the tension of the spring elements, the latter serving to collapse or contract the area of the bag or trough as the animal eats therefrom.

In both forms of the invention shown a lid 11 is provided which may be closed over the mouth of the upper section to retain the contents of the bag or trough in event the animal has not exhausted the same, and this lid is maintained closed by means of turn buckles 12 carried by the upper section of the bag or trough, or by the guide rods 3 when the invention is made in accordance with the construction shown in Fig. 1 of the drawing. The turn buckles have tongues 12 similar to ordinary commercial buckles, adapted to connect the supporting bag to the strap by which the feed trough or bag may be supported from the head of the animal.

Having thus described the invention what is claimed is—

1. A feed trough or bag comprising a series of rigid annular sections telescopically arranged with relation to each other and interengaging with each other so that the several sections follow each other either in the extension or collapsing of the feed bag or trough, and a spring connected to the outer or bottom section serving to gradually collapse the bag or trough as the food is removed therefrom by the animal.

2. A feed trough or bag comprising a series of rigid annular sections telescopically arranged with relation to each other and interengaging with each other so that the several sections follow each other either in the extension or collapsing of the feed bag or trough, a spring connected to the outer or bottom section serving to gradually collapse the bag or trough as the food is removed therefrom by the animal, a lid for the upper section, and turn buckles for maintaining said lid closed, said buckles having tongues for connection to a supporting band or the like.

3. In a feed bag, an outer section having an inturned flange at its upper edge, an inner section telescoping into said outer section and having an outturned flange on its lower end adapted to interlock with said flange on the outer section, and projections extending outwardly from the inner section for engagement with the upper edge of the outer section whereby to prevent the passage of the inner section down through the outer section.

4. A feed bag comprising a base section having a bottom and having an inturned flange at its upper edge, a plurality of telescoping sections mounted in said base section and having interlocking engagement with the base section whereby to prevent the separation of the sections, and means on the sections for preventing the passage of the plurality of sections below the inturned flange of the base section.

5. A feed bag comprising a plurality of telescoping annular sections, the outermost of which constitutes the lower section provided with a closed bottom, a base, guide rods mounted on the base and extending upwardly about said sections and being secured to the top or innermost section, said sections having out-turned rims at their lower edges and having interior rims at their upper edges adapted to interlock and prevent the separation of the sections, and fingers outstanding from the sections at the top thereof for engagement with the adjacent outer section whereby to prevent the falling of the sections below the interior rims of the outer adjacent sections.

In testimony whereof I have hereunto set my hand in presence of two subscribing witnesses.

GIUSEPPE ALFANO.

Witnesses:
GERTRUDE M. STUCKER,
JOS. J. MAWHINNEY.

---

Copies of this patent may be obtained for five cents each, by addressing the "Commissioner of Patents, Washington, D. C."